United States Patent

Antonelli et al.

Patent Number: 6,107,392
Date of Patent: Aug. 22, 2000

[54] AQUEOUS BRANCHED POLYMER DISPERSION

[75] Inventors: Joseph Albert Antonelli, Riverton; Robert J Barsotti, Franklinville, both of N.J.; Lee Edwin Allen Becton, Media, Pa.; Christopher Scopazzi, Wilmington, Del.

[73] Assignee: E. I. du Pont de Nemours and Company, Wilmington, Del.

[21] Appl. No.: 08/928,118

[22] Filed: Sep. 12, 1997

Related U.S. Application Data

[63] Continuation-in-part of application No. 08/676,306, filed as application No. PCT/US95/00376, Jan. 19, 1995, abandoned, which is a continuation of application No. 08/184,525, Jan. 21, 1994, abandoned.

[51] Int. Cl.[7] ...................................................... C08L 51/00
[52] U.S. Cl. ........................... 524/504; 524/512; 524/533; 524/535; 524/556; 524/558
[58] Field of Search ..................................... 524/504, 512, 524/533, 535, 556, 558

[56] References Cited

U.S. PATENT DOCUMENTS

| | | | |
|---|---|---|---|
| 3,729,439 | 4/1973 | Parker | 260/29.7 |
| 3,801,524 | 4/1974 | Parker | 260/29.6 |
| 3,821,145 | 6/1974 | Walus | 260/29.4 |
| 4,170,582 | 10/1979 | Mori et al. | 260/29.6 |
| 4,255,308 | 3/1981 | Bransen | 260/29.6 |
| 4,329,266 | 5/1982 | Suzuki et al. | 524/376 |
| 4,564,648 | 1/1986 | Huybrechts et al. | 523/423 |
| 4,680,352 | 7/1987 | Janowicz et al. | 526/147 |
| 4,722,984 | 2/1988 | Janowicz | 526/123 |
| 4,746,714 | 5/1988 | Spinelli | 525/286 |
| 4,801,653 | 1/1989 | Das et al. | 525/286 |
| 4,918,129 | 4/1990 | Probst et al. | 524/457 |
| 4,927,875 | 5/1990 | Maska et al. | 524/457 |
| 4,981,901 | 1/1991 | Noda et al. | 524/504 |
| 4,981,921 | 1/1991 | Blum et al. | 525/419 |
| 5,010,140 | 4/1991 | Antonelli et al. | 525/269 |
| 5,098,947 | 3/1992 | Metzger et al. | 524/507 |
| 5,231,131 | 7/1993 | Chu et al. | 524/504 |
| 5,290,633 | 3/1994 | Devlin et al. | 428/423.1 |
| 5,502,113 | 3/1996 | Antonelli et al. | 525/287 |

FOREIGN PATENT DOCUMENTS

| | | |
|---|---|---|
| 0 218 906 | 9/1986 | European Pat. Off. . |
| 0 636 723 | 7/1993 | European Pat. Off. . |
| 1-182304 | 7/1989 | Japan . |
| WO 93/03081 | 2/1993 | WIPO . |

*Primary Examiner*—Judy M. Reddick
*Attorney, Agent, or Firm*—James A. Costello; Sudhir G. Deshmukh

[57] ABSTRACT

An aqueous coating composition comprising a dispersed graft copolymer characterized by macromonomers attached at a terminal end thereof to a polymeric backbone which is acid functional, wherein the functional groups have been neutralized. Such compositions provide improved properties for an automotive finish.

10 Claims, No Drawings

AQUEOUS BRANCHED POLYMER DISPERSION

CROSS-REFERENCE TO RELATED APPLICATIONS

This is a continuation-in-part of U.S. application Ser. No. 08/676,306 filed on Jul. 18, 1996 now abandoned which is a 371 Application of PCT/US95/00376 filed on Jan. 19, 1995 which is a continuation of U.S. application Ser. No. 08/184,525 filed on Jan. 21, 1994, now abandoned.

TECHNICAL FIELD

This invention relates to an improved aqueous composition for coating a variety of substrates. In particular, this invention is directed to a waterborne coating composition comprising a graft copolymer, which is a branched copolymer having neutralized carboxylic functionality.

BACKGROUND OF THE INVENTION

Automobiles and trucks receive exterior finishes for several well known reasons. First, such finishes provide barrier protection against corrosion.

Second, consumers prefer an exterior finish having an attractive aesthetic finish, including high gloss and excellent DOI (distinctness of image).

A typical automobile steel panel or substrate has several layers of finishes or coatings. The substrate is typically first coated with an inorganic rust-proofing zinc or iron phosphate layer over which is provided a primer which can be an electrocoated primer or a repair primer. Optionally, a primer surfacer can be applied to provide for better appearance and/or improved adhesion. A pigmented basecoat or colorcoat is next applied over the primer. A typical basecoat or colorcoat comprises a pigment, which may include metallic flakes in the case of a metallic finish. In order to protect and preserve the aesthetic qualities of the finish on the vehicle, it is well known to provide a clear (unpigmented) topcoat over the colored (pigmented) basecoat, so that the basecoat remains unaffected even on prolonged exposure to the environment or weathering.

Coating compositions comprise one or more film-forming polymers. Most commonly, linear polymers are employed that cure, upon application, by reaction with crosslinking agents. However, the use of non-linear graft copolymers has been disclosed. For example, U.S. Pat. No. 4,801,653 to Das et al. describes the use of hydroxy functional graft copolymers. Das et al. disclose grafting by a condensation reaction between epoxy groups of a glycidyl ester, contained in an acrylic polymer, and carboxy groups on at least a portion of vinyl monomers which are polymerized in the presence of the acrylic polymer.

In preparing graft polymers in general, various living polymerization methods have been disclosed for obtaining functional ended polymers by selective termination of living ends. Such functionally ended polymers may subsequently be attached to another polymer, that is, as so-called macromonomer "arms" on a polymeric backbone to form a comb graft copolymer. Webster, in "Living Polymerization Methods," 251 SCIENCE 887 Feb. 22, 1991) generally discloses living polymerization methods for preparing architectural forms of polymers, including graft and comb copolymers.

Graft copolymers containing carboxyl groups and the preparation of these polymers is shown in Japanese Laid Open Patent Application (Kokai) No. 1-182304 dated Jul. 20, 1989. This reference shows graft copolymers that have carboxyl groups based on acrylic and methacrylic acid in their side chains that have hydrophilic properties and teaches the use tertiary alcohol-based ester units of acrylic or methacrylic acid to form a macromonomer which is used to form a graft copolymer and then is hydrolyzed to form carboxylic acid groups on the polymer. The process taught by the reference is an inefficient process which does not form pure graft copolymer but results in a mixture of graft copolymer and low molecular weight components that are detrimental to pigment dispersions formed from the graft copolymer and finishes formed from such a composition.

U.S. Pat. No. 4,680,352 to Janowicz et al. and U.S. Pat. No. 4,722,984 to Janowicz disclose the use of cobalt (Co) chelates as chain transfer agents in free radical polymerization. The latter patent discloses that macromonomers prepared by cobalt chain transfer can be polymerized to produce graft copolymers which are useful in coating and molding resins, including high solid finishes and aqueous or solvent based finishes, although the use of such polymers have so far found only limited use in the finishes area. The use of chain transfer agents to prepare dispersed polymers used in automotive coatings is disclosed in U.S. Pat. No. 5,010,140.

The present invention relates to aqueous coating compositions.

The evolution of environmental regulations has led to the need for products with lower volatile organic content (VOC). Water dispersible polymers are well known in the art and have been used to form water-based coating compositions, pigment dispersions, adhesives and the like. Much of the prior art, however is directed to either latex or water reducible linear polymers. Latex-based systems tend to have problems with coalescence. Linear water reducible polymers are difficult to process because of high molecular weight.

BASF EP 0363723 describes an acrylic copolymer dispersion for use in an OEM clear coat to be crosslinked with a melamine formaldehyde resin. The linear acrylic copolymer is prepared in a solvent in a two-stage process where the hydrophilic part (acid-functional monomer) is concentrated in one of the two stages. The overall copolymer is afterwards neutralized with an amine and dispersed in water. The difference from a one-stage product is that the solids/viscosity relation is more favorable. A disadvantage of this technology is the fact that the hydrophilic part needs to be over 60% of acid-functional monomer which could give problems in humidity resistance.

Bayer patents EP 0218906 and EP 0324334 describe the synthesis of hydroxy-acid functional acrylic copolymers prepared in solution before neutralizing with an amine and dispersing in water. Bayer EP 0334032 describes the synthesis of an acid functional urethane oligomer which is used to stabilize a WB acrylic copolymer dispersion. AKZO U.S. Pat. No. 5,098,947 describes urethane modified acrylic copolymer dispersions for waterborne coatings.

Regarding the presently claimed waterborne composition, branched copolymers allow for higher molecular weight polymers at lower viscosity compared to linear polymers of the same molecular weight. Such branched copolymers also allow for segmentation of the copolymer into hydrophobic and hydrophilic portions for improved coating properties. Accordingly, the branched copolymers of the present invention are hydrosols that form a dispersed phase at high pH and high water content while forming a solution polymer at low pH and/or high organic solvent/low water content. This ease of inversion can provide coatings with better pin-hole resistance among other desirable properties. Applicants have found that coatings made from such aqueous branched copolymers are hard, water and humidity resistant, and show excellent humidity characteristics.

SUMMARY OF THE INVENTION

The present invention is directed to a water-based coating composition of a binder, (a) plus (b), formed from graft copolymer (a) and optional crosslinking agent (b), in an aqueous carrier (c) comprising:

(a) from 10 to 90 percent, based on the weight of the binder, of a graft copolymer having a weight average molecular weight of 2,000 to 100,000 comprising:
  (i) 5 to 95 percent by weight of the graft polymer of a hydrophilic polymer backbone comprising polymerized ethylenically unsaturated monomers of which 2 to 35 percent by weight have acid functionality; and
  (ii) 95 to 5 percent, by weight of the graft copolymer, of macromonomers attached to said polymeric backbone at a single terminal point of each macromonomer, said macromonomers comprising hydrophobic polymerized ethylenically unsaturated monomers containing substantially no acid functionality and having a weight average molecular weight of about 1,000 to 30,000;

(b) 0 to 40 percent of a crosslinking agent; and (c) from 10 to 90 percent by weight, based on the weight of the composition, of an aqueous carrier comprising at least 50 percent water; wherein said acid functionality is at least partially neutralized with an amine or other neutralizing agent to form a stable dispersion or solution in water.

The terms "hydrophobic" and "hydrophilic" employed herein with respect to the graft copolymer arms and backbone, respectively, are relative terms that nevertheless define an important distinction versus compositions such as pigment dispersions in which graft copolymer arms are hydrophilic compared to the backbone. In view of the teaching presented herein, one skilled in the art will appreciate that the hydrophobic/hydrophilic relationship of graft copolymer component (a) will insure good compositional stability because of relatively small particle size (<0.6 microns), and good binder characteristics of mechanical integrity and water insensitivity.

The term "substantially no acid functionality" in the macromonomer arms of the graft copolymer means less than 0.5%; preferably no more than a trace amount less than about 0.25. Trace amounts of acid monomer(s) can enter the system as impurities, especially via hydroxy-functional monomers, and though unnecessary to the composition may be difficult or impossible to exclude.

The graft copolymer can be present in the binder in a substantial amount or as the primary (majority) component or even as the only film-forming The graft copolymer can be present in the binder in a substantial amount or as the primary (majority) component or even as the only film-forming polymer with the exception of crosslinking agents and rheology controllers. This graft copolymer may also be employed together with other curable components, including a latex or a curable linear film-forming acrylic, polyester, or polyester urethane polymer, in various proportions.

The present composition is especially useful for finishing the exterior of automobiles and trucks and parts thereof. The present composition, depending on the presence of pigments and other conventional components, may be used as a primer, primer surfacer, basecoat, and/or clearcoat. The invention also includes a process for coating a substrate with the above coating composition. The claimed composition further includes a substrate having adhered thereto a coating according to the above composition. The graft copolymer and the process for making the graft copolymer are also part of this invention.

DETAILED DESCRIPTION OF THE INVENTION

Waterborne curable compositions comprising a blend of a dispersed graft copolymer, which contains active hydrogens, and a curing agent are disclosed. The graft copolymer is prepared from an acrylic copolymer macromonomer comprising polymerizable alpha-beta ethylenically unsaturated monomers and a weight average molecular weight (MW) of 1000–30,000, preferably 6000 to 15,000. About 5–95% (by weight), preferably 30–70%, of the macromonomer is copolymerized with 95–5%, preferably 70–30%, of a blend of other alpha, beta-ethylenically unsaturated monomers, at least 2%, preferably 2–30% by weight, most preferably 3–15%, of which have a carboxylic acid functionality, to form a branched or graft copolymer with a MW of 2000–100,000, preferably 5000–40,000, which after neutralizing with an amine or other neutralizing agent can be dispersed in water. (All molecular weights herein are based on GPC using a polystyrene standard.)

It has been found that improved aqueous or waterborne coating systems are obtained by using these graft copolymers in combination with a curing agent, suitably an amine compound as a crosslinker. These polymers can be utilized as film-formers either alone or in combination with a latex or other polymers. Such compositions have the advantage of providing excellent coating properties desirable for automotive finishes.

The waterborne coatings of the present invention comprise an acrylic-based binder system in an aqueous base. This binder system comprises, in its overall concept, a water soluble or dispersible graft acrylic copolymer which is formed by free-radical initiated copolymerization of 5–95% (weight) alpha-beta unsaturated monomers in the presence of 95–5% of an acrylic macromonomer.

The acrylic macromonomer is anionic in character with a preferred average number molecular weight (MN) of between 500 to 20,000 and containing less than about 1% of an acid functional alpha-beta unsaturated monomer, so that the backbone remains relatively hydrophilic and the macromonomer side chains remain relatively hydrophobic, following at least partial neutralization of the carboxyl groups with, for example, an amine. These acrylic resins form stable solutions or dispersions in water, typically as a dispersed polymer having an average particle size diameter of 10 nm to 1 micron, preferably 20 to 400 nm.

In general, the total polymeric and oligomeric components of a coating composition are conventionally referred to as the "binder" or "binder solids" and are dissolved, emulsified or otherwise dispersed in an aqueous liquid carrier. The binder solids generally include all the normally solid polymeric components of the composition. Generally, catalysts, pigments, or chemical additives such as stabilizers are not considered part of the binder solids. Non-binder solids other than pigments usually do not amount for more than about 10% by weight of the composition. The total coating composition of the present invention suitably contains about 10–70%, more typically 15–50% by weight of binder, and about 30–90%, more typically 50–85% by weight, of an aqueous carrier. The carrier is at least 50% water, preferably 75 to 95% water.

The present composition suitably comprises about 10 to 90 percent, preferably 20 to 60%, based on the weight of the binder, of the specified graft polymer.

The side chains of the graft copolymer are preferably hydrophobic relative to the backbone and therefore contain less than 1% by weight, preferably essentially zero percent by weight, based on the weight of the graft copolymer, of polymerized ethylenically unsaturated acid-functional monomers which are listed hereinafter. The side chains contain polymerized hydrophobic monomers such as alkyl methacrylates and acrylates, cycloaliphatic methacrylates and acrylates and aryl methacrylates and acrylates as are listed hereinafter and also may contain up to 30% by weight, based on the weight of the graft copolymer, of polymerized ethylenically unsaturated non-hydrophobic monomers which may contain functional groups. Examples of such monomers are hydroxy ethyl acrylate, hydroxy ethyl methacrylate, acrylamide, nitro phenol acrylate, nitro phenol methacrylate, phthalimido methyl acrylate, phthalimido methacrylate, acrylic acid, acryloamido propane sulfonic acid, and mixtures thereof.

The acrylic macromonomer may be prepared using a free radical initiator in a solvent with a Co (II) or Co (III) chelate chain transfer agent.

The backbone of the graft polymer contains preferable at least 2 percent by weight of an acid functional (neutralized) monomer as, e.g., acrylic acid, methacrylic acid, maleic acid, itaconic acid and the like. Methacrylic and acrylic acid are preferred. Other acids that can be used are ethylenically unsaturated sulfonic, sulfinic, phosphoric or phosphonic acid and esters thereof also can be used such as styrene sulfonic acid, acrylamido methyl propane sulfonic acid, vinyl phosphonic or phosphoric acid and its esters and the like.

The backbone is preferably based on 2–30% methacrylic acid, preferably 3 to 15% and has an MN=500–30,000. The acid functional groups on the graft copolymer are neutralized with an inorganic base or an amine. The backbone is thus relatively hydrophilic and keeps the graft polymer well dispersed in the resulting coating composition. Of course, relative hydrophobicity or hydrophilicity could be further adjusted by varying the percent of acid and/or hydroxy functional monomers versus more hydrophobic monomers such as 2-ethyl hexyl methacrylate.

In the preferred embodiments, the waterborne acrylic graft copolymers contain overall (including both backbone and macromonomer arms) about 0 to 40, preferably 5 to 40, and more preferably 10 to 30, parts by weight of hydroxy functional acrylic monomers as, e.g., 2-hydroxyethyl acrylate, 2-hydroxyethyl methacrylate, 2-hydroxypropyl acrylate, 2-hydroxypropyl methacrylate, 2-hydroxybutyl acrylate, and 4-hydroxybutyl acrylate. These hydroxy groups can be used for crosslinking in addition to the acid groups. Hydroxy groups are not necessary when acid groups are the only crosslinking functionality on the copolymer. Hydroxy groups are necessary when the crosslinking agent is melamine or blocked isocyanate.

As indicated earlier, the graft polymer comprises macromonomeric side chains attached to a polymeric backbone. Each macromonomer ideally contains a single terminal ethylenically unsaturated group which is polymerized into the backbone of the graft copolymer and typically contains polymerized monomers of esters and/or nitriles and/or amides of methacrylic or acrylic acid or mixtures of these monomers.

Other polymerized ethylenically unsaturated monomers can be present in the macromonomer and backbone, for example (but not limited to), acrylic and methacrylic acid esters of straight-chain or branched monoalcohols of 1 to 20 carbon atoms. Alkyl acrylates having 1–12 carbons in the alkyl group can be used such as methyl acrylate, ethyl acrylate, propyl acrylate, isopropyl acrylate, butyl acrylate, pentyl acrylate, hexyl acrylate, 2-ethyl acrylate, nonyl acrylate, lauryl acrylate and the like can be used. Cycloaliphatic acrylates can be used such as trimethylcyclohexyl acrylate, t-butyl cyclohexyl acrylate, cyclohexyl methacrylate, isobornyl methacrylate, 2-ethylhexyl methacrylate, and the like. Aryl acrylates such as benzyl acrylate also can be used.

Ethylenically unsaturated monomers containing hydroxy functionality include hydroxy alkyl acrylates and hydroxy alkyl methacrylates, wherein the alkyl has 1 to 12 carbon atoms. Suitable monomers include hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate, and the like, and mixtures thereof. Hydroxy functionality may also be obtained from monomer precursors, for example, the epoxy group of a glycidyl methacrylate unit in a polymer. Such an epoxy group may be converted, in a post polymerization reaction with water or a small amount of acid, to a hydroxy group.

Suitable other olefinically unsaturated comonomers include: acrylamide and methacrylamide and derivatives as alkoxy methyl (meth) acrylamide monomers, such as methacrylamide, N-isobutoxymethyl methacrylamide, and N-methylol methacrylamide; maleic, itaconic and fumaric anhydride and its half and diesters; vinyl aromatics such as styrene and vinyltoluene; and polyethylene glycol monoacrylates and monomethacrylates.

Other functional monomers as itaconic or maleic anhydride, the half ester thereof, acrylonitrile, allylmethacrylate, aceto acetoxyethyl methacrylate, methylacryl amidoglycolate methylether, ethylene urea ethyl methacrylate, 2-acrylamide-2 methyl propanesulfonic acid, trialkoxy silyl ethyl methcrylate, reaction products of mono epoxyesters or monoepoxy ethers with alpha-beta unsaturated acids and reaction products of glycidyl (meth) acrylate with mono functional acids up to 22 carbon atoms.

The above monomers also can be used in the backbone of the graft copolymer.

The graft polymer may be prepared by polymerizing ethylenically unsaturated monomers in the presence of macromonomers each having a terminal ethylene unsaturation for grafting. The resulting graft polymer can be envisioned as being composed of a backbone having a plurality of macromonomer "arms" attached thereto. In the present composition, both the macromonomer arms and the backbone may have reactive fimctionalities capable of reacting with a crosslinking compound or polymer, although it is optional to have such reactive functionalities only or essentially only or substantially only on the backbone.

It is to be understood that the backbone or macromonomers referred to as having functionality may be part of a mixture of macromonomers of which a portion do not have any functionality or variable amounts of functionality. It is also understood that, in preparing any backbone or macromonomers, there is a normal distribution of functionality.

To ensure that the resulting macromonomer only has one terminal ethylenically unsaturated group which will polymerize with the backbone monomers to form the graft copolymer, the macromonomer is polymerized by using a catalytic chain transfer agent. Typically, in the first step of the process for preparing the macromonomer, the monomers are blended with an inert organic solvent which is water miscible or water dispersible and a cobalt chain transfer agent and heated usually to the reflux temperature of the reaction mixture. In subsequent steps additional monomers and cobalt catalyst and conventional polymerization catalyst are added and polymerization is continued until a macromonomer is formed of the desired molecular weight.

Preferred cobalt chain transfer agents or catalysts are described in U.S. Pat. No. 4,680,352 to Janowicz et al and U.S. Pat. No. 4,722,984 to Janowicz. Most preferred are pentacyanocobaltate (II), diaquabis (borondifluorodimethylglyoximato) cobaltate(II) and diaquabis(borondifluorophenylglyoximato) cobaltate (II). Cobalt (III) versions of these catalysts are also preferred. Typically these chain transfer agents are used at concentrations of about 5–1000 ppm based on the monomers used.

The macromonomer is preferably formed in a solvent or solvent blend using a free radical initiator and a Co (II) or (III) chelate chain transfer agent. Examples of solvents are aromatics, aliphatics, ketones, glycol ethers, acetates, alcohols as, e.g., methyl ethyl ketone, isopropyl alcohol, n-butylglycolether, n-butyl diethyleneglycol ether, propylene glycol methylether acetate, propyleneglycol methylether, and N-butanol.

Peroxy- and azo-initiators (0.5–5% weight on monomer) can be used in the synthesis of the macromonomers in the presence of 2–5,000 ppm (on total monomer) or Co (II) chelate in the temperature range between 70–160° C., more preferably azo-type initiators as, e.g., 2,2'-azobis (2,4 dimethylpentanenitrile), 2,2'-azobis (2-methylpropanenitrile), 2,2'-azobis (2-methylbutanenitrile), 1,1'-azo (cyclohexane carbonitrile) and 4,4'-azobis (4-cyanopentanoic) acid.

After the macromonomer is formed as described above, solvent is optionally stripped off and the backbone monomers are added to the macromonomer along with additional solvent and polymerization catalyst. Any of the aforementioned azo-type catalysts can be used as can other suitable catalysts such as peroxides and hydroperoxides. Typical of such catalysts are di-tertiarybutyl peroxide, di-cumylperoxide, tertiaryamyl peroxide, cumenehydroperoxide, di(n-propyl) peroxydicarbonate, peresters such as amyl peroxyacetate and the like. Commercially available peroxy type initiators include, e.g., t-butylperoxide or Triganox™ B from AKZO, t-butylperacetate or Triganox™ FC50 from AKZO, t-butylperbenzoate or Triganox™ C from AKZO, and t-butylperpivalate or Triganox™ 25 C-75 from AKZO. Polymerization is continued at or below the reflux temperature of the reaction mixture until a graft copolymer is formed of the desired molecular weight.

Typical solvents that can be used to form the macromonomer or the graft copolymer are ketones such as methyl ethyl ketone, isobutyl ketone, ethyl amyl ketone, acetone, alcohols such as methanol, ethanol, isopropanol, esters such as ethyl acetate, glycols such as ethylene glycol, propylene glycol, ethers such as tetrahydrofuran, ethylene glycol mono butyl ether and the like.

In the synthesis of the macromonomer and/or the graft copolymer small amounts of difunctional alpha-beta unsaturated compounds can be used as, e.g., ethyleneglycol dimethacrylate or hexanedioldiacrylate.

After the graft copolymer is formed, it is neutralized with an amine or an inorganic base such as ammonium hydroxide or sodium hydroxide and then water is added to form a dispersion. Typical amines that can be used include AMP (2-amino-2-methyl-1-propanol, dimethyl-AMP, amino methyl propanol, amino ethyl propanol, dimethyl ethanol amine, triethylamine and the like. One preferred amine is amino methyl propanol and the preferred inorganic base is ammonium hydroxide.

The conversion into a water dispersion may be accomplished preferably by stripping our 30 to 60% of the solvent followed by admixing with an organic amine or ammonia and diluting with water, or by admixing with a solution of water and amine after the solvent stripping. Alternatively, the polymerized graft copolymer solution, after stripping, can be stirred slowly into a solution of water and the amine. The degree of neutralization of the dispersion can be from 10 to 150% of the total amount of acid groups, preferably from 40–105%. The final pH of the dispersion can accordingly be about 4–10, preferably 7–9. The solvents can be stripped-off eventually afterwards.

The overall graft copolymer water borne dispersion should be characterized by an acid value of from 5 to about 150 (mg KOH/g resin solids), more preferably from 10 to about 70 and still more preferably from 15 to about 35, and an hydroxyl number of about 0 to about 250 (mg KOH/g resin solids), more preferably from 40 to 150. If the graft copolymer waterborne dispersion is used to be crosslinked with a water dispersible polyisocyanate, it could also have, but not necessarily, an amine number (mg KOH/g resin solids) of 0–200, more preferably from 20–150.

Particularly useful graft copolymers include the following:

a graft copolymer having a backbone of polymerized acrylate or methacrylate monomers, styrene monomers, methacrylic or acrylic acid monomers, and hydroxy-functional acrylate or methacrylate monomers, and side chains of a macromonomer having a weight average molecular weight of about 2,000–30,000 and containing about 50% by weight, based on the weight of the backbone, of polymerized alkyl methacrylate or acrylate monomers, alkyl hexyl acrylate or methacrylate monomers, and hydroxy-functional acrylate or methacrylate monomers, based on the weight of the backbone, of polymerized methacrylic acid.

a graft copolymer having the above backbone of side chains comprising polymerized methyl methacrylate, butyl acrylate, methacrylic acid, styrene, and hydroxyethyl acrylate.

a graft copolymer having macromonomers comprising polymerized 2-ethylhexyl acrylate, butyl methacrylate, and hydroxyethyl methacrylate.

The afore described binder systems are utilized to produce waterborne coatings by blending with other suitable components in accordance with normal paint formulation techniques.

Linear film-forming polymers, preferably 0 to 55 percent by weight, based on the weight of the binder, may also be used in conjunction with the graft copolymer.

The graft copolymers of the present invention are useful as film forming vehicles in the preparation of high solids coating compositions such as, for example, clearcoat compositions useful in automotive applications.

In preparing the coating compositions of the present invention, the graft copolymer is combined with a crosslinking agent.

The binder may be cured with a curing agent containing N-methylol and/or N-methylol ether groups or blocked isocyanate, as well be readily practiced by those skilled in the art. Examples of such curing agents are amino resins obtained by reacting an aldehyde, such as formaldehyde, with a compound containing amino group such as melamine, urea and benzoguanamine and total or partial etherification of the N-methylol group with an alcohol such as, e.g., methanol, n-butanol, isobutanol.

It is possible to use the present branched copolymers in a lacquer without a cross-linker, particularly for ambient dried coating systems or automotive refinish.

To form a composition which will crosslink under elevated baking temperatures of about 60–180° C. for about 5–60 mins., about 10 to 40%, preferably 15 to 30% by weight, based on the weight of the binder, of a water-soluble water dispersible alkylated melamine formaldehyde crosslinking agent having 1–4 carbon atoms on the alkylated group is preferred.

These crosslinking agents are generally partially alkylated melamine formaldehyde compounds and may be monomeric or polymeric and if polymeric have a degree of polymerization of about 1–3. Typical alcohols used to alkylate these resins are methanol, ethanol, propanol, butanol, isobutanol, and the like. Preferred alkylated melamine crosslinking agents that are commercially available include Cymel™ 373, Cymel™ 385, Resimine™ 714, Resinine™ 730 and 731, Resimine™ 735 and 745.

Coating compositions of this invention containing a melamine crosslinking agent can contain about 0.1 to 1.0%, based on the weight of a binder, of a strong acid catalyst or a salt thereof to lower curing temperatures and time. Paratoluene sulfonic acid is a preferred catalyst or its ammonium salt. Other catalysts that can be used are dodecyl benzene sulfonic acid, phosphoric acid and amine or ammonium salts of these acids.

As indicated above, other film forming polymers can also be used such as acrylourethanes, polyesters and polyester urethanes, polyethers and polyether urethanes that are compatible with the graft polymer. From about 20 to 70 percent, preferably 30 to 50 percent of a latex may also be used in conjunction with the above-described branched polymer. As well known by those skilled in the art, acrylic lattices are commercially available from ICI, Rohm & Haas and others, for example, Neocryl™ latex (ICI, Wilmington, Del.).

Although the composition is aqueous, a solvent is also typically utilized, preferably in minimal amounts, to facilitate formulation and application of the coating compositions of the present invention. An organic solvent is utilized which is compatible with the components of the composition. The amounts of graft copolymer, curing agent, and catalyst will, of course, vary widely depending upon many factors, among them the specific components of the composition and the intended use of the composition.

In addition, a composition according to the present invention may contain a variety of other optional ingredients, including pigments, pearlescent flakes, fillers, plasticizers, antioxidants, surfactants and flow control agents.

To improve weatherability of a finish produced by the present coating composition, an ultraviolet light stabilizer or a combination of ultraviolet light stabilizers can be added in the amount of about 0.1–5% by weight, based on the weight of the binder. Such stabilizers include ultraviolet light absorbers, screeners, quenchers, and specific hindered amine light stabilizers. Also, an anitoxidant can be added, in the about 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

The composition may also include conventional formulation additives such as flow control agents, for example, Resiflow® S (polybutylacrylate), BYK 320 and 325 (high molecular weight polyacrylates); rheology control agents, such as fumed silica and thickeners such as the Acrylsol™ copolymers from Rohm & Haas.

When the present composition is used as a clearcoat (topcoat) over a pigmented colorcoat (basecoat) to provide a colorcoat/clearcoat finish, small amounts of pigment can be added to the clear coat to provide special color or aesthetic effects such as tinting.

The composition has excellent adhesion to a variety of metallic or non-metallic substrates, such as previously painted substrates, cold rolled steel, phosphatized steel, and steel coated with conventional primers by electrodeposition. The present composition can be used to coat plastic substrates such as polyester reinforced fiberglass, reaction injection-molded urethanes and partially crystalline polyamides.

When the present coating composition is used as a basecoat, colorcoat, monocoat, primer surfacer or primer, then the composition includes pigments such as, for example, the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo reds, benzimidazolinones, metallic flake pigments such as aluminum flake and the like.

The pigments can be introduced into the coating composition by first forming a mill base or pigment dipersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition to obtain the present coating compositions.

The coating composition can be applied by conventional techniques such as spraying, electrostatic spraying, dipping, brushing, flowcoating and the like. The preferred techniques are spraying and electrostatic spraying. In OEM applications, the composition is typically baked at 100–150° C. for about 15–30 minutes to form a coating about 0.1–3.0 mils thick. When the composition is used as a clearcoat, it is applied over the colorcoat which may be dried to a tack-free state and cured or preferably flash dried for a short period before the clearcoat is applied. The colorcoat/clearcoat finish is then baked as mentioned above to provide a dried and cured finish. The present invention is also applicable to non-baking refinish systems, as will be readily appreciated by those skilled in the art.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following Examples illustrate the invention. All parts and percentages are on a weight basis unless otherwise indicated. All molecular weights disclosed herein are determined by gel permeation chromatography using a polystyrene standard.

EXAMPLE 1

This example illustrates the preparation of a macromonomer of 5% isobutyl methacrylate, 10% hydroxyethyl methacrylate, and 85% 2-ethyl hexyl methacrylate, for use in preparing a branched copolymer. To a 2-liter flask fitted with an agitator, condenser, heating mantle, nitrogen inlet, thermocouple and an addition port was added 20.32 g of isobutyl methacrylate, 345.5 g of 2-ethyl hexyl methacrylate, 40.64 g of hydroxy ethyl methacrylate and 183.8 g of toluene. The mixture was agitated and heated to reflux (122–126° C.) under nitrogen. To this was then added, as a shot, a pre-mix of a solution of 0.35 g of Vazoo® 88 initiator, 13.8 g of toluene and 12.9 g of a 0.17% solution of bis(boron difluoro diphenyl glyoximato) cobaltate(II) in methyl ethyl ketone. This was followed by the addition of a pre-mix of a solution of 17.8 g of isobutyl methacrylate, 303.2 g of 2-ethyl hexyl methacrylate, 35.7 g of hydroxy ethyl methacrylate, 1.35 g of Vazo ® 88 initiator, and 12.0 g of xylene, 74.5 g of toluene and 4.3 g of a 0.17% solution of bis(boron difluoro diphenyl glyoximato) cobaltate(II) in methyl ethyl ketone over 240 mins. while maintaining reflux (116–122° C.). Following a 30 mins. hold period, a pre-mixed solution of 0.32 g of Vazo® 88 initiator and 30.54 g of toluene was added over 60 mins. while maintaining reflux. The batch was then held at reflux for an additional 60 mins. and then cooled. The macromonomer thus prepared has a number average molecular weight of 6469 and a weight average molecular weight of 9546 as determined by GPC. Weight solids are 63.6% and Gardner viscosity I. The percent terminal vinyl unsaturation is greater than 95 as determined by thermogravimetric analysis.

EXAMPLE 2

This example illustrates the preparation of a branched copolymer for use in a composition according to the present invention. To a 5-liter flask fitted with an agitator, condenser, heating mantle, nitrogen inlet, thermocouple and an addition part was added 1490.1 g of macromonomer from Example 1 above, 457.8 g of βuty Cellosolve® carrier, 305.2 g of isopropanol and the temperature raised to reflux (100–105° C.) under nitrogen. This was followed by the addition of a premixed solution of 381.5 g of methyl methacrylate (MMA), 47.7 g of methacrylate acid (MAA), 190.7 g of styrene (STY), 95.4 g of hydroxy ethyl acrylate (HEA), 238.4 g of butyl acrylate (BA), 11.92 g of Vazo® 88 initiator and 95.4 g of Butyl Cellosolve® carrier and 47.7 g of isopropanol over 180 mins. holding temperature at reflux. Following a 60 minute hold period, a premixed solution of 4.77 g of Vazo® 88 initiator and 133.51 g of toluene was added over 60 mins. holding reflux. This was followed by a hold period of 120 mins. at reflux after which the batch was cooled. Molecular weight via gel permeation chromatography is 8946 number average and 20,830 weight average. Weight solids are 55% and Gardner viscosity is R. The ration of backbone to macromonomer arms is about 50/50. The composition of the backbone is STY/MMA/BA/HEA/MAA in the weight ratio of 20/40/25/10/5.

EXAMPLE 3

This example illustrates the preparation of an aqueous dispersion of a branched copolymer. To a 2-liter flask fitted with an agitator, condenser, heating mantle, nitrogen inlet, thermocouple and an addition port was added 500 g of branched copolymer from Example 2 above and the temperature raised to distill 133.3 g of solvent. The batch was cooled to 110° C. at which time a mixture of 4.27 g dimethyl ethanol amine and 10 g deionized water were added to neutralize the acid functionality of the branch copolymer to 60%, theoretical. The batch was agitated for 10 mins. at which time 719.1 gms. deionized water was slowly added with good agitation and the temperature reduced to less than 40° C. A white dispersion of the branched polymer was obtained of weight solids 25%, Gardner viscosity A3, PH 8.7 and a particle size of 147 nanometers as determined by quasielectric light scattering.

EXAMPLE 4

This example illustrates another preparation of an aqueous dispersion of a branched copolymer according to the present invention. A process identical to Example 3 was carried out except that the level of amine is 5.69 g to achieve a percent neutralization of 80 percent. Weight solids are 25%, Gardner viscosity A2, Ph 9.05 and a particle size of 100 nanometers.

EXAMPLE 5

This example illustrates a composition prepared according to Example 3 except with a level of amine of 7.11 g to achieve a percent neutralization of 100 percent. Weight solids are 25%, Gardner viscosity A+1/2, pH 9.20 and a particle size of 71 nanometers.

EXAMPLE 6

This example illustrates the preparation of a macromonomer for use in the present invention. To a 2-liter flask fitted with an agitator, condenser, heating mantle, nitrogen inlet, thermocouple and an addition port was added 20.3 g of isobutyl methacrylate, 304.8 g of 2-ethyl hexyl methacrylate, 81.4 g of hydroxy ethyl methacrylate, 160.3 g of toluene and 100.3 g of butyl acetate. The mixture was agitated and heated to reflux (135–140° C.) under nitrogen. To this was then added, as a shot, a pre-mix of a solution of 0.35 g of Vazo™ 88 initiator, 13.8 g of toluene and 17.2 g of a 0.17% solution of bis(boron difluoro diphenyl glyoximato) cobaltate(II) in methyl ethyl ketone. This was followed by the addition of a pre-mix of a solution of 17.8 g of isobutyl methacrylate, 268.1 g of 2-ethyl hexyl methacrylate, 71.6 g of hydroxy ethyl methacrylate, 1.35 g of VaZo™ 88 initiator and 86.8 g of toluene over 240 mins. while maintaining reflux (116–122° C.). Following a 30 mins. hold period, a pre-mixed solution of 0.32 g of Vazo™ 88 initiator and 23.0 g of toluene was added over 60 mins. while maintaining reflux. The batch was then held at reflux for an additional 60 mins. at which time a mixture of 0.23 g of t-butyl peroctoate and 31.5 g of Butyl Cellosolve® carrier was added as a shot and the reaction mixture then cooled. The macromonomer thus prepared has a number average molecular weight of 5250 and a weight average molecular weight of 8920 as determined by GPC. Weight solids are 63.6% and Gardner viscosity T. The percent terminal vinyl unsaturation is greater than 95 as determined by thermogravimetric analysis. The composition of the macromonomer is 75 parts 2-ethyl hexyl methacrylate, 5 parts isobutyl methacrylate and 20 parts hydroxy ethyl methacrylate.

EXAMPLE 7

This example illustrates the preparation of a branched copolymer for use in the present invention. To a 2-liter flask fitted with an agitator, condenser, heating mantle, nitrogen inlet, thermocouple and an addition port was added 306.5 g of macromonomer from Example 6 above, 272.8 g of Butyl Cellosolve® carrier, 22.7 g of toluene and the temperature raised to 100° C. under nitrogen. This was followed by the addition of a premixed solution of 122.8 g of methyl methacrylate, 31.8 g of methacrylic acid, 91.0 g of styrene, 91.0 g of hydroxy ethyl acrylate, 118.2 g of butyl acrylate, 11.4 g of Vazo® 88 carrier, 9.1 g of Butyl Cellosolve® carrier and 77.3 g of toluene over 180 mins. holding the temperature at 100° C. This was followed by a hold period of 60 mins. at 100° C. at which time the temperature was lowered to 90° C. over 30 mins. and the batch held at this temperature with agitation for 270 mins. and then cooled. Molecular weight via gel permeation chromatography is 16,040 number average and 39470 weight average. The weight solids are 55% and Gardner viscosity is Y. The composition of the backbone is STY/MMA/BA/HEA/MAA in the weight ratio of 20/27/26/20/7 and the ratio of backbone to the graft is 70/30 by weight.

EXAMPLE 8

This example illustrates the preparation of a water-based dispersion 80 percent neutralized. To a 2-liter flask fitted with an agitator, condenser, heating mantle, nitrogen inlet, thermocouple and an addition port was added 500 g of branched copolymer from Example 7 above and the temperature raised to distill 133 g of solvent. The batch was cooled to 80° C. at which time 11.6 g AMP-95® (95% solution of 2-amino 1 propanol in water) was added to neutralize the acid functionality of the branch copolymer to 80%, theoretical. The batch was agitated for 10 mins. at which time 722 g of deionized water was slowly added with good agitation and the temperature reduced to less than 40° C. A white dispersion of the branched copolymer was obtained of weight solids 25%, Gardner viscosity L, pH 8.5 and a particle size of 29 nanometers as determined by quasielectric light scattering.

EXAMPLE 9

This example illustrates the preparation of a water-based dispersion neutralized with another amine compound. A process identical to Example 8 was run substituting dimethyl amino ethanol on an equivalent basis for AMP. The pH of the dispersion in water was 8.7, viscosity M and particle size was 34 nanometers.

EXAMPLE 10

This example illustrates the preparation of a water-based dispersion neutralized with another amine compound A process identical to Example 8 was run substituting diisopropanol amine on an equivalent basis for AMP. The pH of the dispersion in water was 8.4, viscosity J and particle size was 35 nanometers.

EXAMPLE 11

This example illustrates the preparation of a water-based dispersion neutralized with ammonia. A process identical to Example 8 was run substituting ammonia on an equivalent basis for AMP. The pH of the dispersion in water was 8.1, viscosity A and particle size was 45 nanometers.

EXAMPLE 12

This example illustrates the preparation of a branched copolymer.

To a 5-liter flask fitted with an agitator, condenser, heating mantle, nitrogen inlet, thermocouple and an addition port was added 1941.2 g of macromonomer from Example 6 above, 472.1 g of Butyl Cellosolve® carrier and the temperature raised to 110° C. under nitrogen. This was followed by the addition of a premixed solution of 165.7 g of methyl methacrylate, 58.0 g of acrylic acid, 331.0 g of styrene, 82.8 g of hydroxy ethyl acrylate, 190.5 g of butyl acrylate, 26.5 g of Vazo® 88 initiator, 74.5 g of Butyl Cellosolve® carrier, 107.7 g of methyl ethyl ketone and 49.7 g of toluene over 180 mins. holding the temperature at 110° C. This was followed by a hold period of 180 mins. at 110° C. at which time the temperature was cooled. The molecular weight via gel permeation chromatography was 8,720 number average and 20,570 weight average. The weight solids are 60% and the Gardner viscosity is U. The composition of the backbone is STY/MMA/BA/HEA/AA in the weight ratio of 40/20/23/10/7 and the weight ratio of backbone to graft is 40/60.

EXAMPLE 13

This example illustrates the preparation of another water-based dispersion. To a 5-liter flask fitted with an agitator, condenser, heating mantle, nitrogen inlet, thermocouple and an addition port was added 1397 g of branched copolymer from Example 12 and the temperature raised to distill 351 g of solvent. The batch was cooled to 80° C. at which time 20 g of dimethyl ethanol amine was added to neutralize the acid functionality of the branch copolymer to 70%, theoretical. The batch was agitated for 10 mins. at which time 1724 g of deionized water was slowly added with good agitation and the temperature reduced to less than 40° C. A white dispersion of the branched polymer was obtained of weight solids 30%, Gardner viscosity T, pH 8.3 and a particle size of 321 nanometers as determined by quasielectric light scattering.

EXAMPLE 14

This example illustrates the preparation of an acrylic latex polymer for use in the present composition. To a 5-liter flask fitted with an agitator, condenser, heating mantle, nitrogen inlet, thermocouple and an addition port was added 1308 g deionized water, and the temperature raised to 85° C. with agitation. In a separate container, the following mixture (Part 1) was prepared: 229 g methyl methacrylate, 160 g styrene, 875 g of 2-ethyl hexyl methacrylate, 320 g hydroxyethyl methacrylate. 16 g methacrylic acid, 20 g Trem™ LF-40 (Henkel, Inc.) and 961 g deionized water. This mixture was preemulsified with an Eppenbach™ homogenizer and 5% was then added to the flask after an 85° C. temperature was attained. This was followed by addition, as a shot, of a mixture of 30 g deionized water and 3 g ammonium persulfate. The remainder (95%) of Part 1 was then added to the flask over 90 mins. keeping the temperature constant at 88–90° C. The addition of Part 1 was followed by the addition, as a shot, of a mixture of 10 g deionized water and 1 g ammonium persulfate after which the contents of the flask were held at 88–90° C. for 2 hours with agitation. The mixture was cooled to 60° C. at which time 50 g of water and 17 g of 2-amino-1-propanol was added slowly and the mixture further cooled to room temperature. The percent weight solids are 40 and the particle size of the latex is 200 nanometers (nm).

EXAMPLE 15

This example illustrates the preparation of a clearcoat formulation according to the present invention. To a pint can was added, with stirring, 200 g of aqueous branched polymer dispersion from Example 2 above, 15.4 g Cymel™325 (polymeric melamine from American Cyanamid), 2.2 g of a 28% solution of dodecyl benzene sulfonic acid and 9% AMP-95™ in deionized water, 5.6 g ASE-60™ thickener (from Rohm & Haas) and 5.6 g of a 10% solution of dimethyl ethanol amine in deionized water. The mixture was agitated for 30 mins. The pH is 8.5 and the 5-rpm-Brookfield viscosity is 12 poise. A drawdown of the clear was applied over Elpo™ primed-steel panels with an 8 milblade and cured at 265° F. for 30 mins. Dry-film thickness is 1.8 mils. This clearcoat was smooth, hard (11 Knoop), well cured (100+MEK solvent rubs) and passed a 96 hour humidity test (110° F./100% humidity) with no blistering or water spotting.

EXAMPLE 16

This example illustrates a basecoat formulation according to the present invention. The procedure and ingredients were the same as in Example 15, but with the addition of 82 g of Ti Pure R-942™ titanium oxide slurry (76%) in deionized water (from DuPont). The paint was adjusted to 12 poise viscosity (5-rpm-Brookfield) with 16 g water and spray applied onto Elpo™ primed-steel panels, followed by a 5-mins. bake at 165° F. This basecoat was then clearcoated with an acrylic/isocyanate (DES™ 3390) high-solids clearcoat, followed by a bake of 30 mins. at 250° F. The dry-film thickness of the basecoat was 1.4 mils and that of the clearcoat was 1.8 mils. The basecoat/clearcoat was glossy (20° gloss of 94), smooth (95 distinctness of image or DOI), hard, and passed a 96-hour humidity test with no blistering or water spotting.

EXAMPLE 17

This example illustrates another clearcoat formulation according to the present invention. To a pint can was added with stirring 90 g of aqueous branched polymer from Example 8 above, 74 g of latex from Example 14 above, 12.1 g Cymel™ 1161 polymeric melamine (from American Cyanamid), 2.2 g of a 28% solution of dodecyl benzene sulfonic acid and 9% AMP-95™ in deionized water, 21.5 g βutyl Cellosolve™ and 5 g of a 10% solution of AMP-95™ in deionized water. This mixture was agitated for 30 mins. and reduced to a viscosity of 12 poise at 5-rpm-Brookfield. A drawdown of the clear was applied over Elpo™ primed steel panels with an 8 miliblade and cured at 265° F. for 30 mins. The dry-film thickness was 1.8 mils. This clearcoat was smooth, hard, and passed the 96-hour humidity test (110° F./100% humidity) with no blistering or water spotting.

EXAMPLE 18

This example illustrates another basecoat formulation according to the present invention. To a pint can was added, with stirring, 456 g of aqueous branched polymer dispersion from Example 2 above, 52 g Cymel™325 polymeric melamine (from American Cyanamid), 7.3 g of a 28% solution of dodecyl benzene sulfonic acid and 9% AMP-95™ solution in deionized water, 4 g βutyl Cellosolve™, 173 g Spensol™ L-52 polyurethane (from Reichold Chemical) and 273 g of Ti Pure R-942™ TiO$_2$ slurry (76%) in deionized water (from DuPont). The pH was 8.5 and the viscosity (5-rpm-Brookfield) was 12 poise. The basecoat was sprayed over Elpo™ primed-steel panels, baked at 165° F. for 5 mins. and then clearcoated with an acrylic/isocyanate (DES™ 3390) clearcoat. The basecoat/clearcoat combination was then cured at 250° F. for 30 mins. The final coating was hard, glossy and passed a 96-hour humidity test with no blistering or water spotting.

We claim:

1. A water-based coating composition of a binder, (a) plus (b), formed from graft copolymer (a) and optional crosslinking agent (b), in an aqueous carrier (c) comprising:

(a) from 10 to 90 percent, based on the weight of the binder, of a graft copolymer having a weight average molecular weight of 2,000 to 100,000 comprising:
  (i) 5 to 95 percent by weight of the graft copolymer of a hydrophilic polymer backbone comprising polymerized ethylenically unsaturated monomers of which 2 to 35 percent by weight of the graft copolymer have acid functionality; and
  (ii) 95 to 5 percent by weight of the graft copolymer of macromonomers attached to said polymer backbone at a single terminal point of each macromonomer, said macromonomers comprising hydrophobic polymerized ethylenically unsaturated monomers containing less than 0.5 weight percent by weight of the graft copolymer acid functionality and having a weight average molecular weight of about 1,000 to 30,000;

(b) 0 to 40 weight percent of a crosslinking agent based on the weight of the binder; and (c) from 10 to 90 percent by weight, based on the weight of the composition, of an aqueous carrier comprising at least 50 weight percent water based on the weight of the composition; wherein said acid functionality is at least partially neutralized with an amine or other neutralizing agent to form a stable dispersion or solution in water.

2. The composition of claim 1, wherein said graft copolymer (a) comprises 30 to 70 percent by weight of the graft copolymer of said polymer backbone and 70 to 30 percent by weight of the graft copolymer of said macromonomers.

3. The composition of claim 2 wherein 3 to 15 percent by weight of the graft copolymer of the polymer backbone comprises monomers that have said acid functionality.

4. The composition of claim 1, wherein the graft copolymer comprises 5 to 40 percent by weight of the graft copolymer of polymerized monomers having a hydroxyl functionality.

5. The composition of claim 1 wherein said crosslinking agent (b) is a melamine.

6. The coating composition of claim 1 wherein at least 10 percent by weight of the graft copolymer of the acid functionality is neutralized with said amine or an inorganic base.

7. The composition of claim 1, in which the polymer backbone contains 2 to 30 percent by weight of the graft copolymer of said acid functionality and the graft copolymer has a weight average molecular weight of 5,000 to 40,000, and an acid value of 30 to 700, an amine value of 0 to 200, and a hydroxyl value of 0 to 300.

8. The composition of claim 7 comprising from 10 to 40 percent by weight of said crosslinking agent (b), based on weight of the binder, and wherein the graft copolymer has a hydroxyl value of 30 to 150, and an amine value of 0 to 100.

9. The composition of claim 1 wherein said polymer backbone or said macromonomers further comprise polymerized ethylenically unsaturated monomers not containing acid functionality said monomers being selected from the group consisting of alkyl acrylates, alkyl methacrylates, cycloaliphatic acrylates, cycloaliphatic methacrylates, aryl acrylates, aryl methacrylates, styrene, alkyl styrene, acrylonitrile, and mixtures thereof.

10. The composition of claim 9 wherein said polymerized ethylenically unsaturated monomers containing acid functionality are selected from the group consisting of acrylic acid, and methacrylic acid.

* * * * *